(12) United States Patent
Müller

(10) Patent No.: US 10,816,425 B2
(45) Date of Patent: Oct. 27, 2020

(54) FIBRE-OPTIC PRESSURE SENSOR HAVING AN OPTICAL RESONATOR AND A METHOD FOR PRESSURE MEASUREMENT

(71) Applicant: FOS4X GMBH, Munich (DE)

(72) Inventor: Mathias Müller, Munich (DE)

(73) Assignee: FOS4X GMBH, Munich (DE)

( * ) Notice: Subject to any disclaimer, the term of this patent is extended or adjusted under 35 U.S.C. 154(b) by 256 days.

(21) Appl. No.: 15/761,155

(22) PCT Filed: Sep. 20, 2016

(86) PCT No.: PCT/EP2016/072307
§ 371 (c)(1),
(2) Date: Mar. 19, 2018

(87) PCT Pub. No.: WO2017/050765
PCT Pub. Date: Mar. 30, 2017

(65) Prior Publication Data
US 2018/0259410 A1    Sep. 13, 2018

(30) Foreign Application Priority Data

Sep. 21, 2015   (DE) .......... 10 2015 115 926

(51) Int. Cl.
*G01L 11/02*  (2006.01)
*G01L 19/00*  (2006.01)
(Continued)

(52) U.S. Cl.
CPC .......... *G01L 11/025* (2013.01); *G01L 9/0079* (2013.01); *G01L 19/0092* (2013.01); *G02B 6/262* (2013.01)

(58) Field of Classification Search
None
See application file for complete search history.

(56) References Cited

U.S. PATENT DOCUMENTS

| 5,559,358 A * | 9/1996 | Burns ................. G01J 5/44 |
| | | 257/415 |
| 8,542,365 B2 * | 9/2013 | Pruessner ............ G01G 3/165 |
| | | 356/480 |

(Continued)

FOREIGN PATENT DOCUMENTS

| CN | 2141565 Y | 9/1993 |
| CN | 1309761 A | 8/2001 |

(Continued)

OTHER PUBLICATIONS

German Examination Report dated Oct. 19, 2015 for Application No. 10 2015 115 926.0.

(Continued)

*Primary Examiner* — Natalie Huls
*Assistant Examiner* — Jermaine L Jenkins
(74) *Attorney, Agent, or Firm* — Moser Taboada

(57) ABSTRACT

There is provided a fiber-optic pressure sensor (110), which includes a waveguide (112) having an end, an optical deflection unit (301) connected to the end of the waveguide (112), and a sensor body (300) at which an optical resonator (302) is formed by way of a diaphragm (303). The waveguide (112) and/or the deflection unit (301) is/are attached to the sensor body (300) by way of a curable adhesive or a solder connection.

15 Claims, 7 Drawing Sheets

(51) Int. Cl.
*G01L 9/00* (2006.01)
*G02B 6/26* (2006.01)

(56) References Cited

U.S. PATENT DOCUMENTS

| | | | | |
|---|---|---|---|---|
| 8,578,786 | B2* | 11/2013 | Hertel | G01F 1/3263 |
| | | | | 73/861.22 |
| 8,837,884 | B2* | 9/2014 | Suzuki | G02B 6/305 |
| | | | | 385/27 |
| 8,995,798 | B1* | 3/2015 | Paritsky | G02B 5/09 |
| | | | | 385/12 |
| 2003/0035611 | A1* | 2/2003 | Shi | G02B 6/122 |
| | | | | 385/16 |
| 2009/0320605 | A1 | 12/2009 | Antila et al. | |
| 2011/0023617 | A1 | 2/2011 | Yu et al. | |
| 2012/0210797 | A1 | 8/2012 | Yu et al. | |

FOREIGN PATENT DOCUMENTS

| | | |
|---|---|---|
| CN | 101485558 A | 7/2009 |
| CN | 101832832 A | 9/2010 |
| CN | 102688095 A | 9/2012 |
| CN | 103162878 A | 6/2013 |
| CN | 103620458 A | 3/2014 |
| CN | 104739377 A | 7/2015 |
| DE | 69902376 T2 | 2/2003 |
| WO | WO-2014142958 A1 | 9/2014 |

OTHER PUBLICATIONS

International Search Report and Written Opinion dated Feb. 21, 2017 for PCT Application No. PCT/EP2016/072307.
China National Intellectual Property Administration Search Report on application No. 201680054359.4 dated Aug. 27, 2019.

* cited by examiner

FIBRE-OPTIC PRESSURE SENSOR HAVING AN OPTICAL RESONATOR AND A METHOD FOR PRESSURE MEASUREMENT

TECHNICAL FIELD

Embodiments of the present invention generally relate to a pressure sensor, in particular to a fiber-optic pressure sensor, which is suitable, for example, for capturing pressure, pressure variations, acoustic and static signals, for measuring in fluids and/or for open-loop and closed-loop control of wind turbines. Embodiments furthermore relate to a method for pressure measurement and to a production method for a fiber-optic pressure sensor.

PRIOR ART

Pressure sensors are generally designed to be measuring devices that convert a pressure as a force per unit area into an electrical output variable. Such pressure sensors are used for various open-loop and closed-loop control purposes, for example for measuring airborne sound, structure-borne sound, static pressure etc. in different media. In many cases, pressure measurement relies on a measurable deflection of a pressure diaphragm. In addition to electrically capturing such a deflection, for example using strain gauges, optical diaphragm capturing is available.

Optics-based capturing of a diaphragm deflection for determining a pressure present at the diaphragm has, among other things, the property that electrical disturbances are eliminated, or at least reduced, and that electromagnetic compatibility is ensured. It is therefore desirable to further improve fiber-optic sensors for pressure capturing.

BRIEF SUMMARY OF THE INVENTION

Provided in accordance with an embodiment is a fiber-optic pressure sensor which has a waveguide having an end, an optical deflection unit connected to the end of the waveguide, and a sensor body at which an optical resonator is formed by way of a diaphragm, wherein the waveguide and/or the deflection unit is/are attached to the sensor body by way of a curable adhesive or a solder connection.

Provided according to a further embodiment is a method for pressure measurement, having the operation of: providing a sensor body having at least one pressure-sensitive sensor diaphragm, forming an optical resonator with the diaphragm, radiating light that is coupled out of an end of the waveguide into the optical resonator, applying pressure to be measured to the diaphragm, capturing an optical interference spectrum that is output from the optical resonator, and evaluating the interference spectrum to determine the pressure to be measured.

Provided according to yet another embodiment is a method for producing a fiber-optic pressure sensor, having the operations of: providing a sensor body, forming an optical resonator in the sensor body, wherein the sensor body has at least one sensor diaphragm, positioning a waveguide at the sensor body in a measurement position such that optical radiation that is transmitted by the waveguide passes through the optical resonator at a spatial position that corresponds to a specified transmission wavelength.

BRIEF DESCRIPTION OF THE DRAWINGS

Exemplary embodiments are illustrated in the drawings and explained in more detail in the following description. In the drawings.

The same reference numbers in the drawings designate identical components or blocks, or components or blocks having identical functions.

WAYS OF IMPLEMENTING THE INVENTION

Figure 1A:
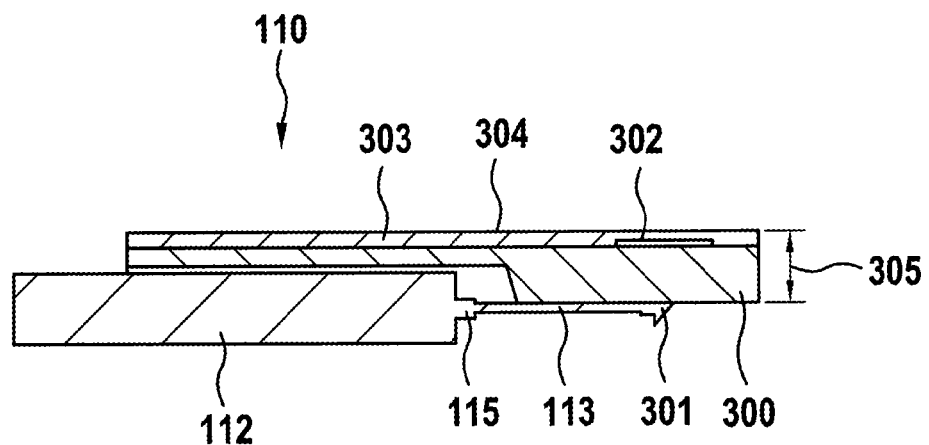
FIG. 1A schematically shows a fiber-optic pressure sensor having a cavity in a longitudinal section along a waveguide axis, in accordance with an embodiment.

More detailed reference is made below to various embodiments of the invention, wherein one or more examples are illustrated in the drawings.

FIG. 1A schematically shows a fiber-optic pressure sensor 110 in a longitudinal section along a waveguide axis of a waveguide 112, in accordance with an embodiment. As is shown in FIG. 1A, the waveguide 112 extends below a sensor body 300. A cavity 302, which is covered by a sensor diaphragm 303, is formed in the sensor body 300. The sensor body 300 in its entirety is provided with a cover 304 such that a settable overall sensor thickness 305 is obtained.

At a longitudinal position below the cavity 302, the outer protective cladding of the waveguide 112 has been removed, with the result that a waveguide cladding 115 and/or a waveguide core 113 extend along the lower side of the sensor body 300.

Attached to one end or near the end of the waveguide 112 is an optical deflection unit 301 which serves to deflect light exiting the waveguide by approximately 90° in the direction of the sensor body 300, for example by 60° to 120°, and thus to the cavity 302. The end of the waveguide 112 here serves both as a light exit surface for emitting light in the direction of the optical deflection unit 301 and as a light entrance surface for receiving light that is reflected back from the cavity 302.

Light radiates through the sensor body 300, which is for example in the form of a substrate, in a manner such that light can enter the cavity 302 and be reflected at the sensor diaphragm 303. The upper side and the lower side of the cavity thus form an optical resonator, such as for example a Fabry-Perot resonator. The spectrum of the light reflected into the optical fiber exhibits an interference spectrum, in particular interference maxima or interference minima, the position of which depends on the size of the optical resonator. Owing to an analysis of the position of the maxima or minima in the reflected spectrum, it is possible to detect a change in the resonator size or a pressure-dependent deflection of the sensor diaphragm 303.

In order to provide a fiber-optic pressure sensor, as is illustrated, for example, in FIG. 1A, particularly easily on a rotor blade, in particular in an external radial region, it is advantageous if the fiber-optic pressure sensor in a cross section perpendicular to the waveguide 112 in FIG. 1A has a small dimension 305. By way of example, a maximum dimension 305 in a cross section perpendicular to the axis of the waveguide 112 can be 10 mm or less, and can in particular be 5 mm or less. Due to the configuration as it is illustrated with respect to FIG. 1A, such dimensions can be easily implemented.

To perform a pressure measurement, the sensor diaphragm 303 is exposed to the pressure to be captured. In dependence on the pressure applied, the diaphragm curves, as a result of which the cross sectional dimensions of the cavity 302 and thus of the optical resonator decrease.

In accordance with a further embodiment, which is combinable with its described embodiments, the sensor unit 110 can furthermore be used for the measurement of acceleration approximately perpendicular with respect to the surface of the sensor diaphragm 303. It is advantageous in this respect if a mass connected to the sensor diaphragm upper side is provided, as is described below with reference to FIGS. 3A and 3B.

Figure 1B:
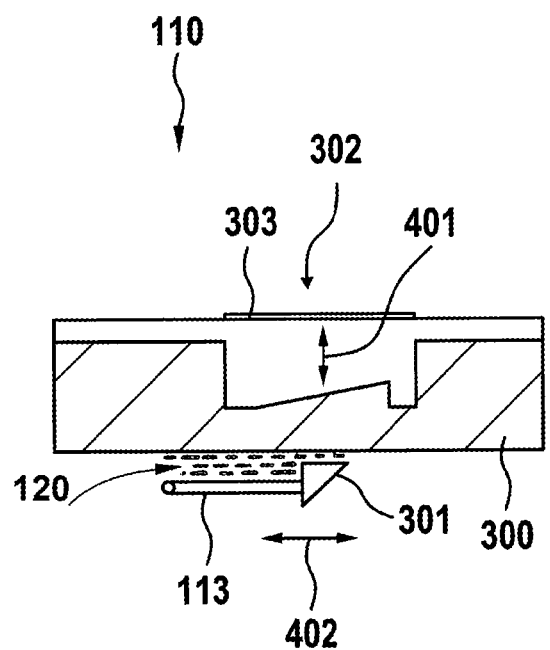
FIG. 1B shows the positioning of an optical deflection unit with respect to the cavity in more detail, in accordance with an embodiment.

FIG. 1B shows in more detail a method for positioning the optical deflection unit 301 with respect to the cavity 302. As is shown in FIG. 1B, the cavity 302 has a differing length 401 along the longitudinal extent of the waveguide 112. The length 401 of the cavity 302 determines the reflection spectrum of the optical resonator 302. The position of the interference maxima or minima of the light output from the resonator is determined in this way. In accordance with a further described embodiment, which is combinable with other embodiments described herein, an interference spectrum is captured.

Specifically, the method for producing a fiber-optic pressure sensor includes the operations: providing a sensor body 300, forming an optical resonator 302 in the sensor body 300, wherein the sensor body 300 has at least one sensor diaphragm 303, positioning a waveguide 112 on the sensor body in a measurement position 402 such that optical radiation that is transmitted by the waveguide 112 passes through the optical resonator 302 at a spatial position that corresponds to a specified transmission wavelength. Finally, attaching the waveguide 112 and/or the deflection unit 301 to the sensor body 300 in the measurement position 402 is performed.

According to an embodiment, which can be combined with other embodiments described herein, the end of the waveguide 112 or the deflection unit 301 is positioned such that optical radiation that has been transmitted by the waveguide 112 passes through the optical resonator 302 at a spatial position that corresponds to a specified transmission wavelength. Forming the optical resonator 302 here includes forming a resonator which has a varying length 401 parallel with respect to the sensor diaphragm 303. When the desired transmission wavelength is set, the waveguide 112 and/or the deflection unit 301 is attached to the sensor body 300 in the measurement position 402 (shown in FIG. 1B). In particular, positioning of the waveguide 112 can include positioning an optical deflection unit 301, which is connected to an end of the waveguide 112, at the sensor body 300 in a measurement position 402 such that optical radiation, which has been transmitted by the waveguide 112 and deflected using the deflection unit 301, passes through the optical resonator 302 at a spatial position that corresponds to the specified transmission wavelength. According to a further embodiment, which can be combined with other embodiments described herein, positioning can include displacing the deflection unit 301 together with the waveguide 112 in a direction 112 substantially parallel with respect to the sensor diaphragm 303.

According to an embodiment, which can be combined with other embodiments described herein, attaching the waveguide 112, 115, 113 and/or the deflection unit 301 to the sensor body 300 in the measurement position 402 is performed by way of adhesive bonding or soldering 120.

According to a further embodiment, the fiber-optic pressure sensor 110 and/or the end of the waveguide 112 have at least one optical beam shaping component, for example at the end of the waveguide core 113, to shape the beam exiting the waveguide core 113, for example to expand it. The optical beam shaping component has at least one of the following: a gradient index lens (GRIN lens), a micro mirror, a prism, a spherical lens, and any desired combination thereof.

According to a further embodiment, which can be combined with other embodiments described herein, the deflection unit 301 can be integrally formed with one of the following: a gradient index lens (GRIN lens), a micro mirror, a prism, a spherical lens, and any desired combination thereof.

In this way, a fiber-optic pressure sensor 110 is obtained which has: a waveguide 112 having an end, an optical deflection unit 301 connected to the end of the waveguide 112, and the sensor body 300, on which an optical resonator 302 is formed by way of the sensor diaphragm 303, wherein the waveguide 112 and/or the deflection unit 301 are attached to the sensor body 300 by way of a curable adhesive or a solder connection. According to an embodiment, the curable adhesive can be provided in the form of an adhesive that is curable using UV light.

According to a further embodiment, which can be combined with other embodiments described herein, the sensor body 300 and/or the cavity 302 and/or the sensor diaphragm 303 and/or the cover 304 can be formed monolithically, in particular in the form of a monolithic glass body. According to embodiments which are combinable with other embodiments described herein, the cover 304 can be fused onto the sensor body 300, for example.

According to embodiments, which are combinable with other embodiments described herein, the optical resonator 302 can be in the form of a Fabry-Perot interferometer which forms a cavity with the at least one sensor diaphragm 303. It is possible in this way to achieve a high resolution during capturing of a pressure-dependent deflection of the sensor diaphragm 303.

According to embodiments, which are combinable with other embodiments described herein, the optical resonator 302 can form a cavity which is closed off in an airtight manner with respect to the surrounding area and has a predetermined internal pressure. This offers the possibility of performing a reference measurement that relates to the internal pressure. For a measurement of a static pressure, the region of the optical resonator 302 can be separate from the ambient pressure, and the diaphragm moves when the ambient pressure changes. For the measurement of a sound pressure level, the diaphragm is designed such that it performs a movement at a corresponding sound pressure, in particular an oscillating movement, which is transferred into an optical signal by way of the optical resonator.

According to further embodiments, which are combinable with embodiments described herein, the optical resonator 302 can form a cavity that is closed off in an airtight manner from the surrounding area and is evacuated.

It is possible with a fiber-optic pressure sensor 110 of this type to perform an optical pressure measurement by way of the following operations: providing the sensor body 300 with at least one pressure-sensitive sensor diaphragm 303, forming the optical resonator 302 with the diaphragm 303, radiating light, which is coupled out of an end of the waveguide 112, into the optical resonator 302, applying a pressure to be measured to the diaphragm 303, capturing an optical interference spectrum that is output from the optical resonator, and evaluating the interference spectrum to determine the pressure to be measured. During evaluation, the phase position of the interference spectrum can be evaluated. Used to this end for the evaluation is, for example, a sinusoidal interference spectrum via an edge filter. According to an exemplary embodiment, which can be combined with other exemplary embodiments described herein, the spectrum can be selected such that some periods of the interference spectrum are covered by the light source. In other words, it is typically possible for an interference period of 20 nm to be provided, while the light source width is 50 nm. Due to the spectral evaluation, the coherence length of the incident radiation may not be taken into consideration here.

According to embodiments, which are combinable with other embodiments described herein, the fiber-optic pressure sensor 110 can furthermore be used for measuring acceleration in a direction that is approximately perpendicular with respect to the surface of the optical resonator 302.

Figure 2A:
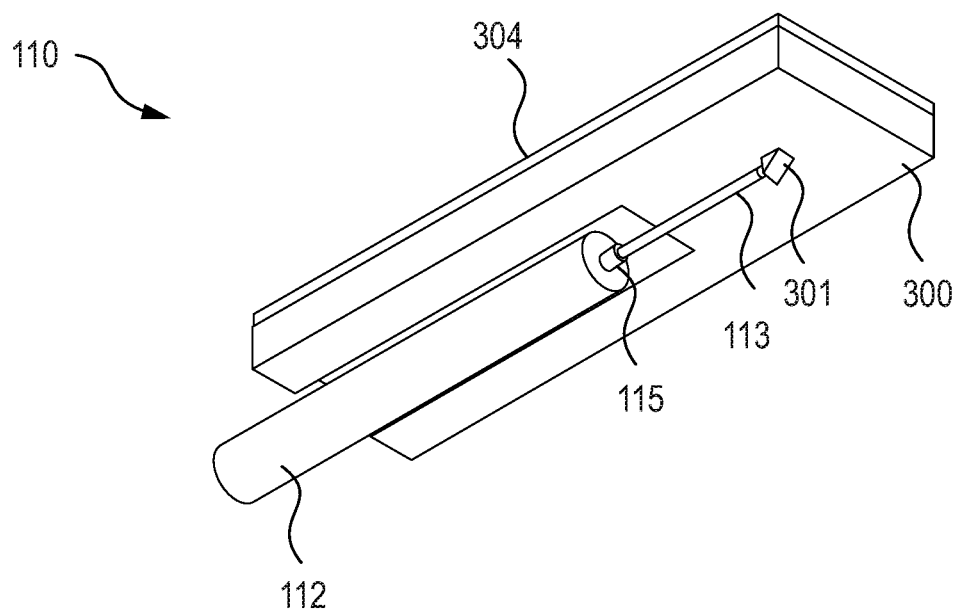
FIG. 2A schematically shows the fiber-optic pressure sensor, illustrated in FIGS. 1A, 1B, in a perspective view from the side of a waveguide input coupling location.
Figure 2B:
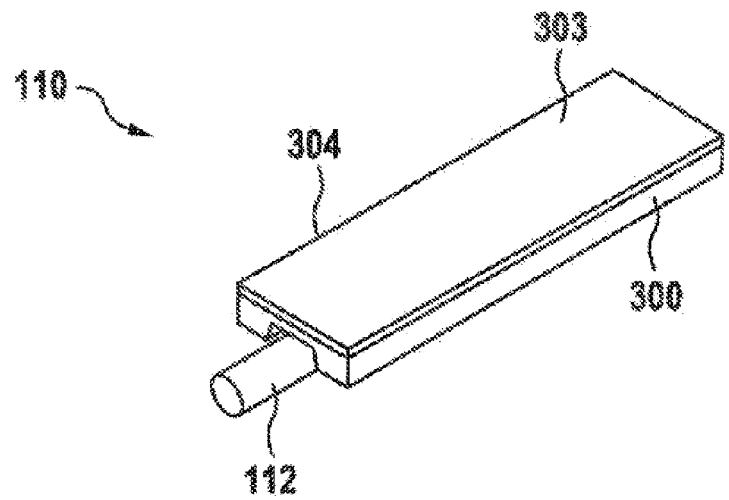
FIG. 2B schematically shows the fiber-optic pressure sensor, illustrated in FIGS. 1A, 1B, in a perspective view from the side of a pressure diaphragm.

FIGS. 2A and 2B show further views of the fiber-optic pressure sensor 110 from different viewing angles so as to illustrate a typical embodiment.

FIG. 2A schematically shows the fiber-optic pressure sensor illustrated in FIG. 1A in a perspective view from the side of a waveguide input coupling location. As shown in FIG. 2A, the waveguide 112 is embedded on the underside of the sensor body 300, wherein the waveguide 112 can extend in a direction approximately parallel with respect to the surface of the optical resonator 302. The sensor body has, for example at the side facing away from the diaphragm, a cutout for receiving the waveguide. The waveguide core 113 has, at its end, the deflection unit 301, which is configured in accordance with an embodiment in the form of a deflection prism. To facilitate positioning of the waveguide 112 in the measurement position 402 (see FIG. 1B), the sensor body 300 in accordance with embodiments can have, at its underside, a cutout, for example a V-shaped groove, for receiving the waveguide 112, as is illustrated in FIGS. 1A, 2A and 2B.

According to a further embodiment, which can be combined with other embodiments described herein, attaching the waveguide 112 and/or the deflection unit 301 to the sensor body 300 can be performed by way of a curable adhesive or by way of a solder connection.

According to a further embodiment, which can be combined with other embodiments described herein, the deflection unit 301 can be formed monolithically together with the end of the waveguide 112.

FIG. 2B schematically shows the fiber-optic pressure sensor illustrated in FIG. 1A in a perspective view from the side of the sensor diaphragm 303. As is shown in FIG. 2B, the fiber-optic pressure sensor 110 is covered by the cover 304, wherein the sensor body 300 can form an integral unit with the cover 304. By way of example, the cover can be arranged on the sensor body and subsequently connected thereto or fused there with by heating, in particular an adhesive connection is expedient.

Figure 3A:
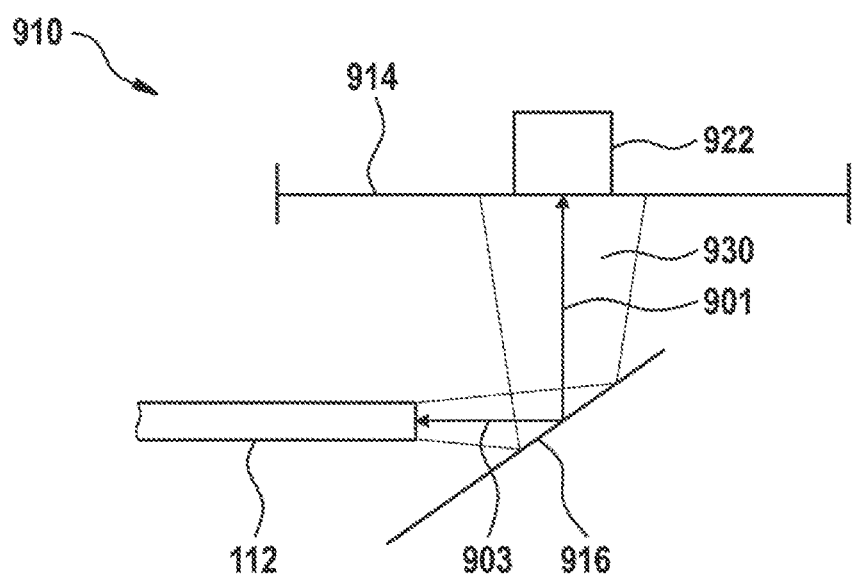
FIG. 3A schematically shows a fiber-optic acceleration sensor having an optical resonator.

FIG. 3A schematically shows a fiber-optic pressure sensor or acceleration sensor 910 having an optical resonator 930. The principle of a fiber-optic acceleration sensor 910 is based on a similar effect as that of the fiber-optic pressure sensor, i.e. a deflection of a diaphragm changes the length of a resonator. According to some embodiments of pressure and/or acceleration sensors, as illustrated in FIG. 3A by way of the example of an acceleration sensor having a mass 922, the optical resonator 930 can also be formed in a region between the exit surface of the waveguide 112 and a reflective surface of a diaphragm 914. In order to increase the deflection of the diaphragm 914 at a specified acceleration, it is possible, according to some embodiments, which are combinable with embodiments described herein, for an additional mass 922 to be arranged on the diaphragm.

According to embodiments, which are combinable with other embodiments described herein, the fiber-optic sensor 910 can be used for measuring acceleration in a direction approximately perpendicular with respect to the surface of the optical resonator. The fiber-optic sensor 910 can here be provided as an acceleration sensor in the following way. The fiber-optic sensor 910 includes a waveguide 112 or an optical fiber having a light exit surface. The fiber-optic sensor 910 furthermore includes a diaphragm 914 and a mass 922 connected to the diaphragm 303. The mass 922 can either be provided here in addition to the mass of the diaphragm, or the diaphragm can be configured to have a suitable mass of sufficient magnitude. The fiber-optic acceleration sensor 910 thus provided includes an optical resonator 930, which is formed between the light exit surface of the waveguide 112 and the diaphragm 914 along an extent 901, 903. For example, the resonator can be a Fabry-Perot resonator. The fiber-optic acceleration sensor 910 furthermore includes an optical deflection unit 916, which is provided in the beam path between the light exit surface and the diaphragm 914, wherein the optical deflection unit 916 can be arranged in the form of a prism or a mirror at an angle of 30° to 60° relative to an optical axis of the waveguide or the optical fiber. The mirror can be formed, for example, at an angle of 45°.

Figure 3B:
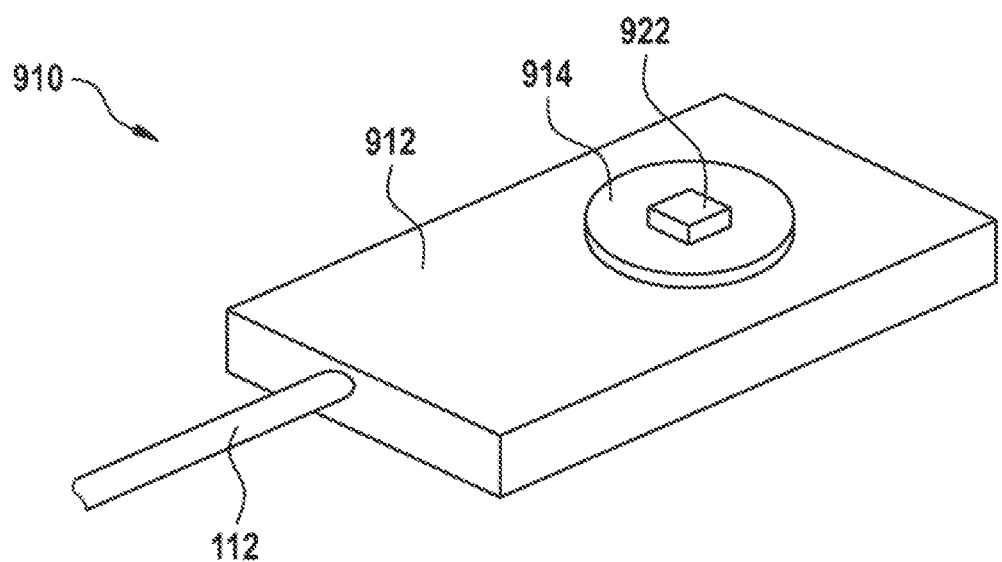
FIG. 3B shows the fiber-optic acceleration sensor illustrated in FIG. 3A in a perspective view.

Embodiments as are explained on the basis of FIGS. 3A and 3B, i.e. embodiments that provide a resonator between the light exit surface of the optical waveguide 112 and the diaphragm, can also be in the form of pressure sensors or sound level sensors, wherein it is possible in this case to dispense with in particular a mass 922 that is arranged on the diaphragm, or the mass of the diaphragm can be appropriately selected.

According to further embodiments, which can be combined with other embodiments, the acceleration sensor 910 is a fiber-optic acceleration sensor. For fiber-optic acceleration sensors, an optical signal is transmitted using the waveguide 112, for example an optical fiber, to an evaluation unit (not illustrated). In a fiber-optic acceleration sensor, the sensor element itself can be provided outside an optical fiber. FIG. 3B shows the fiber-optic acceleration sensor illustrated in FIG. 3A in a perspective view.

As illustrated in FIGS. 3A and 3B, the fiber-optic acceleration sensor 910 is operated such that a primary optical signal is supplied to the acceleration sensor 910 via a waveguide 112. The waveguide can be connected, for example, to a substrate 912. The substrate 912 can consist of a non-metallic material. The diaphragm 914 is formed on the substrate 912 or at the substrate 912. The primary optical signal exiting the waveguide 112 is guided in the direction of the diaphragm 912 by way of a mirror 916.

According to typical embodiments, which can be combined with other embodiments, the mirror 916 can be in the form of a surface that is formed in the substrate 912. For example, the substrate 912 can consist of a material that reflects in a specified wavelength range, typically the wavelength range of the primary optical signal. The mirror can have an angle ranging from 30° to 60°, for example an angle of 45°, relative to the axis of the waveguide.

The primary optical signal is deflected by the mirror 916, as indicated by the arrow 901, and directed onto the diaphragm 914. The primary optical signal is reflected at the diaphragm 914. The reflected light is coupled back into the optical fiber or the waveguide 112 as illustrated by the arrow 903. As a result, the optical resonator 930 is formed between the light exit surface for the exit of the primary optical signal and the diaphragm 914. It should be noted here that the light exit surface of the primary optical signal is generally the same as the light entry surface for the reflected secondary signal. The optical resonator 930 can therefore be in the form of a Fabry-Perot resonator. For a fiber-optic acceleration sensor 910, according to embodiments described herein, the mass 922 can be provided at the diaphragm 914. Alternatively, the mass of the diaphragm itself can serve as the mass for the detection of an acceleration. In the case of an acceleration, the diaphragm 914 is deflected due to the inertia of the mass 922. This results in an optically measurable signal in the optical resonator 930.

According to embodiments described herein, the fiber-optic acceleration sensor 910 is designed to capture an acceleration having a directional component that is approximately perpendicular with respect to the axis of the fiber or of the waveguide 112. Due to the directional component being approximately perpendicular with respect to the axis of the waveguide 112, the fiber-optic acceleration sensor 912 can be used, for example, for methods for monitoring rotor blades, or be incorporated in rotor blades of wind turbines or in wind turbines to permit monitoring.

The components of an extrinsic fiber-optic acceleration sensor 910 illustrated in FIGS. 3A and 3B can consist, according to exemplary embodiments, of the following materials. The waveguide 112 can be, for example, a glass fiber, an optical fiber or an optical waveguide, wherein materials such as optical polymers, polymethyl methacrylate, polycarbonate, quartz glass, ethylene tetrafluoroethylene can be used, which may be doped. The substrate 912 or the mirror 916 which is formed therein can consist of silicon, for example. The diaphragm can be made from a plastics material or a semiconductor that is suitable to be formed into a thin diaphragm. The mass 922 can be made from any non-metallic material, with materials having a high density being particularly suitable. Due to a high density, the dimensions of the mass 922 can be reduced.

If the mass 922 is reduced or dispensed with, the diaphragm 914 can be used both for measuring a static pressure and for measuring a sound pressure level. For measuring a static pressure, the region of the optical resonator 930 is separate from ambient pressure, such that the diaphragm performs a movement upon a change in the ambient pressure. For measuring a sound pressure level, the diaphragm is configured such that it performs a movement at a corresponding sound pressure, in particular an oscillating movement, which is transferred into an optical signal by the optical resonator 930.

In order to use a fiber-optic acceleration sensor 910 for example in a wind turbine, the fiber-optic sensor, as is illustrated for example in FIGS. 3A and 3B, can be provided at a rotor blade, in particular in an external radial region. It is advantageous here if the fiber-optic acceleration sensor 910 in a cross section perpendicular to the waveguide 112 in FIGS. 3A and 3B has small dimensions. For example, a maximum dimension in a cross section perpendicular to the axis of the waveguide 112 can be 10 mm or less, and can in particular be 5 mm or less. Due to the configuration as is illustrated with respect to FIGS. 3A and 3B, such dimensions can be easily implemented.

Figure 4:
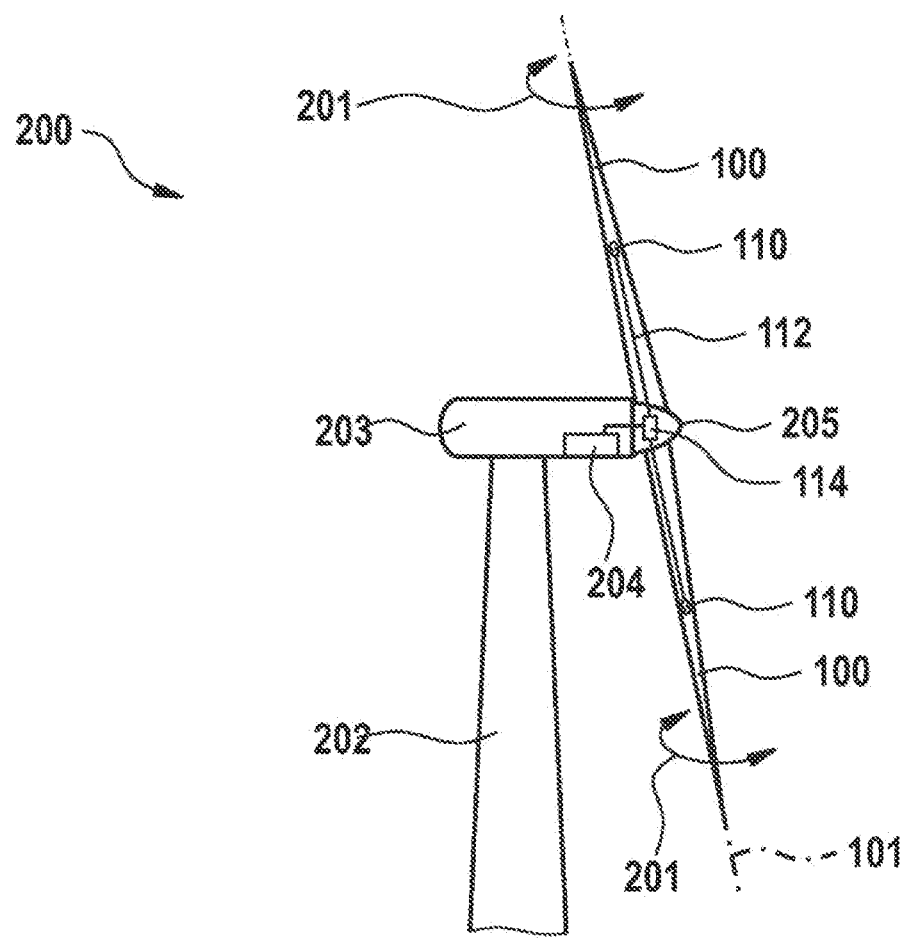
FIG. 4 schematically shows part of a wind turbine having rotor blades and pressure sensors attached thereto.

FIG. 4 shows a wind turbine 200. The wind turbine 200 includes a tower 202 and a nacelle 203. The rotor 500 is attached to the nacelle 203. The rotor 500 includes a hub 205, to which the rotor blades 100 are attached. According to typical embodiments, the rotor 500 has at least two rotor blades, in particular three rotor blades. During operation of the wind generator or the wind turbine, the rotor 500 rotates, i.e. the hub 205 having the rotor blades 100 rotates about an axis. A generator is here driven to produce energy. As is illustrated in FIG. 4, at least one pressure sensor 110 is provided at a rotor blade 100. The pressure sensor 110 is connected to an evaluation unit 114 via a signal line or a waveguide 112. The evaluation unit 114 supplies e.g. a signal to a control unit 204 of the wind turbine 200.

It is particularly expedient, for example for use in rotor blades of wind turbines or for the methods for monitoring wind turbines, for the pressure or the acceleration to be measured in a direction perpendicular to the longitudinal extent of the waveguide 112. Wind generators are subject to complex control that may be necessary, for example, due to changing operating conditions. When monitoring operating states of wind generators, a plurality of sensors are used. For example, pressure can be measured to determine a pressure at a rotor blade, strain can be measured to measure the bending of a rotor blade, acceleration can be measured to measure an acceleration of a rotor blade, or other variable scan be measured. A group of sensors that appear highly promising for future applications are fiber-optic sensors.

Due to the requirements linked to the operation of a wind turbine, such as pressure and temperature variations, weather and atmospheric conditions, but also in particular strongly altering wind conditions, and due to the multiplicity of legally prescribed safety measures, monitoring and the sensors necessary for monitoring are subject to a large number of constraints. For example, a pressure variation can occur at the rotor blades during operation. This can result in an instability along the rotor blade axis, which disturbs the operation of the wind turbine and reduces the energy yield. There is furthermore the possibility that a pressure change, and consequently vibrations or oscillations, may occur in individual rotor blades. In many cases this results in critical operating states, which require complicated open-loop and/or closed-loop control measures. Due to a pressure being measured directly at the rotor blade, it is furthermore possible to find a setting of the pitch angle that is efficient for an energy yield.

According to some embodiments, which can be combined with other embodiments described herein, the pressure sensor 110 is a fiber-optic sensor, in particular a fiber-optic pressure sensor. For fiber-optic pressure sensors, an optical signal, such as for example an interference spectrum, is transmitted to the evaluation unit 114 using a waveguide 112, such as an optical fiber. In a fiber-optic pressure sensor 110, the sensor element itself can be provided outside an optical fiber. One example is described in detail with respect to FIGS. 1A, 1B, 2A and 2B. Each rotor blade 100 can separately have an individual pressure distribution. For this reason, according to some embodiments, which can be combined with other embodiments, at least one fiber-optic pressure sensor 110 is provided in each rotor blade 100.

According to some embodiments described herein, which can be combined with other embodiments, the evaluation unit 114 makes it possible for an ambient pressure of the optical resonator that acts on the sensor diaphragm 303 to be ascertained on the basis of the optical interference signal.

According to some of the embodiments described herein, which can be combined with other embodiments, fiber-optic pressure sensors 110, in which a signal is optically transmitted via a waveguide 112, permit a radial mounting position along a longitudinal extent of the rotor blade 100, which has hitherto been considered as being unfavorable in practice, because transmission using a waveguide 112 or optical fiber involves a reduced risk of lightning damage. For this reason, fiber-optic pressure sensors 110 can be provided such that mounting in a radially exterior region 107 of a rotor blade 110 is permitted without increasing the risk of lightning damage.

Figure 5:
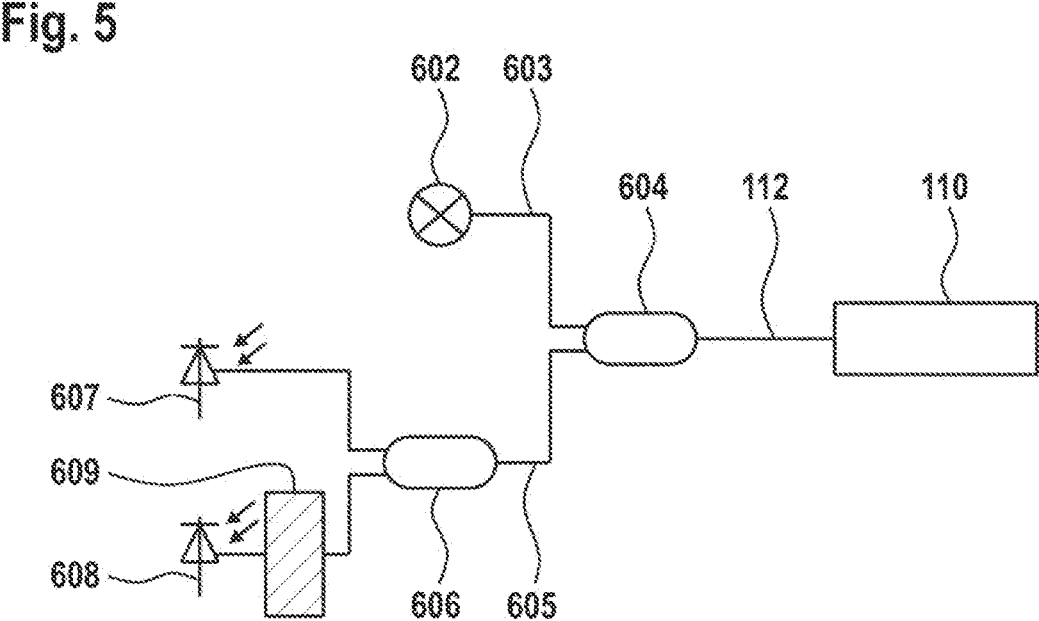
FIG. 5 schematically shows a measurement setup for a fiber-optic pressure sensor according to embodiments described herein.

FIG. 5 shows a typical measurement system for the fiber-optic pressure measurement according to the embodiments described herein. The system includes one or more pressure sensors 110. The system has a source 602 for electromagnetic radiation, for example a primary light source. The source 602 serves for providing optical radiation with which at least one fiber-optic pressure sensor 110 can be irradiated. To this end, an optical transmission fiber or a waveguide 603 is provided between the primary light source 602 and a first fiber coupler 604. The fiber coupler 604 couples the primary light into the optical fiber or the waveguide 112. The source 602 can be, for example, a broadband light source, a laser, an LED (light-emitting diode), an SLD (super luminescent diode), an ASE light source (amplified spontaneous emission light source) or an SOA (semiconductor optical amplifier). It is also possible to use a plurality of sources of the same type or of different types (see above) for embodiments described herein.

The sensor element, such as for example an optical resonator 302, is optically coupled to the sensor fiber 112. The light reflected by the fiber-optic pressure sensors 110 is guided in turn via the fiber coupler 604, which guides the light into a beam splitter 606 via the transmission fiber 605. The beam splitter 606 splits the reflected light for detection using a first detector 607 and a second detector 608. The signal detected on the second detector 608 is here first filtered using an optical filter device 609. Owing to the filter device 609, a position of an interference maximum or minimum that is output from the optical resonator 302 or a wavelength change due to the optical resonator can be detected.

Generally, a measurement system, as is illustrated in FIG. 5, without the beam splitter 606 or the detector 607 can be provided. However, the detector 607 permits normalization of the measurement signal of the pressure sensor with respect to other intensity fluctuations, such as for example fluctuations in the intensity of the source 602, fluctuations due to reflections at intersections between individual waveguides, fluctuations due to reflections at intersections between the waveguide 112 and the deflection unit 301, fluctuations due to reflections at intersections between the deflection unit 301 and the optical resonator 302, or other intensity fluctuations. Said normalization improves the measurement accuracy and, during operation of the measurement system, reduces a dependence on the length of the waveguide 112 provided between the evaluation unit 114 and the fiber-optic pressure sensor 110.

The optical filter device 609 and additional optical filter devices for filtering the interference spectrum and for detecting interference maxima and minima can include an optical filter that is selected from the group consisting of an edge filter, a thin-film filter, a fiber Bragg grating, an LPG, an arrayed waveguide grating (AWG), an echelle grating, a grating arrangement, a prism, an interferometer and any combination thereof.

Figure 6:
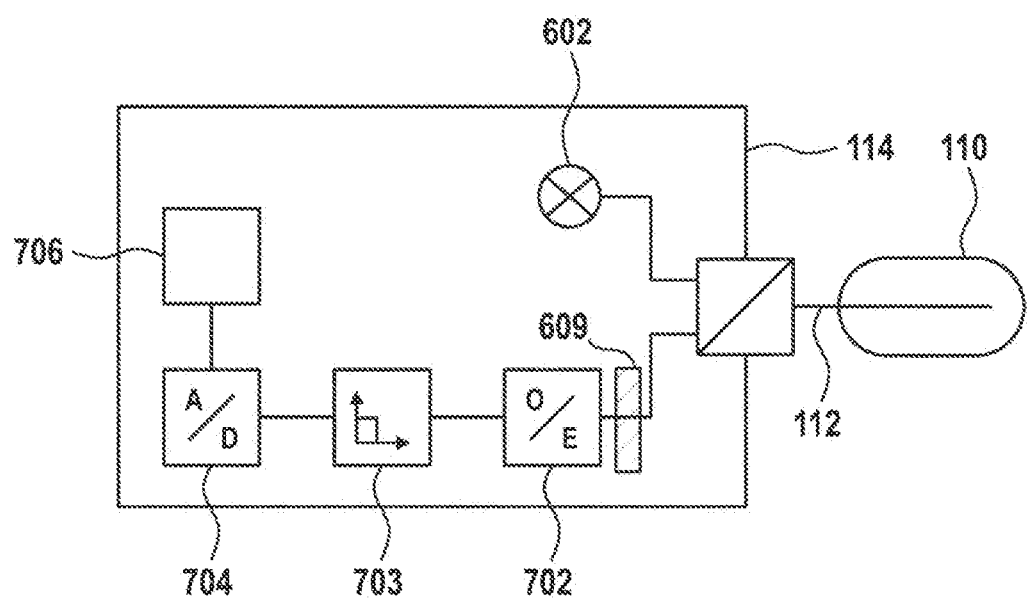
FIG. 6 schematically shows a measurement setup for a fiber-optic pressure sensor according to described herein.

FIG. 6 shows an evaluation unit 114, wherein a signal of a fiber-optic pressure sensor 110 is guided to the evaluation unit 114 via a waveguide 112. FIG. 6 furthermore illustrates a light source 602, which can be provided optionally in the evaluation unit. However, the light source 602 can also be provided independently of or outside the evaluation unit 114. The optical signal of the fiber-optic pressure sensor 110, i.e. the optical interference signal that can have interference maxima and interference minima, is converted into an electrical signal using a detector, i.e. using an opto-electrical converter 702. The electrical signal is filtered using an analog anti-aliasing filter 703. Following the analog filtering using the analog anti-aliasing filter or low-pass filter 703, the signal is digitized using an analog-digital converter 704.

According to some embodiments described herein, which can be combined with other embodiments, the evaluation unit 114 can be configured such that it analyzes the interference signal not only with respect to the location of interference maxima and interference minima, but such that furthermore the phase position of the interference signal is determined.

According to some embodiments described herein, which can be combined with other embodiments, the evaluation unit 114 permits ascertainment of an ambient pressure of the optical resonator 302, acting on the sensor diaphragm 303, on the basis of the optical interference signal. The antialiasing filter can have a cutoff frequency of 1 kHz or less, in particular of 500 Hz or less, more particularly of 100 Hz or less. According to embodiments described herein, such filtering is performed before digitization. According to embodiments described herein, analog low-pass filtering is performed before digitization of a signal of a fiber-optic pressure sensor 110. According to embodiments described herein, which can be combined with other embodiments, the low-pass filter can also be referred to as an analog anti-aliasing filter. Within the context of a sampling theorem, the Nyquist frequency is here taken into consideration, and low-pass filtering with signal components lower than the Nyquist frequency is provided using the analog low-pass filter or analog anti-aliasing filter. Due to the embodiments described herein having a fiber-optic pressure sensor 110 and analog low-pass filtering, improved measurement of a pressure variation can be provided. FIG. 6 furthermore shows a digital evaluation unit 706, which may include, for example, a CPU, memory and other elements for digital data processing.

As is explained with respect to FIG. 6, a method for pressure capturing using a fiber-optic pressure sensor can be improved. For example, an evaluation unit 114 is provided. The evaluation unit 114 can include a converter for converting the optical signal into an electrical signal. The converter used can be, for example, a photodiode, a photomultiplier (PM) or another optoelectronic detector. The evaluation unit 114 furthermore includes an anti-aliasing filter 703, which is connected, for example, to the output of the converter or of the optoelectronic detector. The evaluation unit 114 can furthermore include an analog-digital converter 704, which is connected to the output of the anti-aliasing filter 703. The evaluation unit 114 can moreover include a digital evaluation unit 706, which is set up for evaluating the digitized signals.

According to yet further embodiments, which can be combined with embodiments described herein, temperature compensation can be provided in the fiber-optic pressure sensor 110 such that materials having a very low coefficient of thermal expansion are used for the sensor body 300 and/or the sensor diaphragm 303 and/or the cover 304.

According to embodiments, the waveguide 112 can be, for example, a glass fiber, an optical fiber or a polymer guide, wherein materials such as optical polymers, polymethyl methacrylate, polycarbonate, quartz glass, ethylene tetrafluoroethylene can be used, which may be doped. In particular, the optical fiber can be a single-mode fiber, for example an SMF-28 fiber. The term "SMF fiber" here designates a special type of a standard single-mode fiber.

Figure 7:
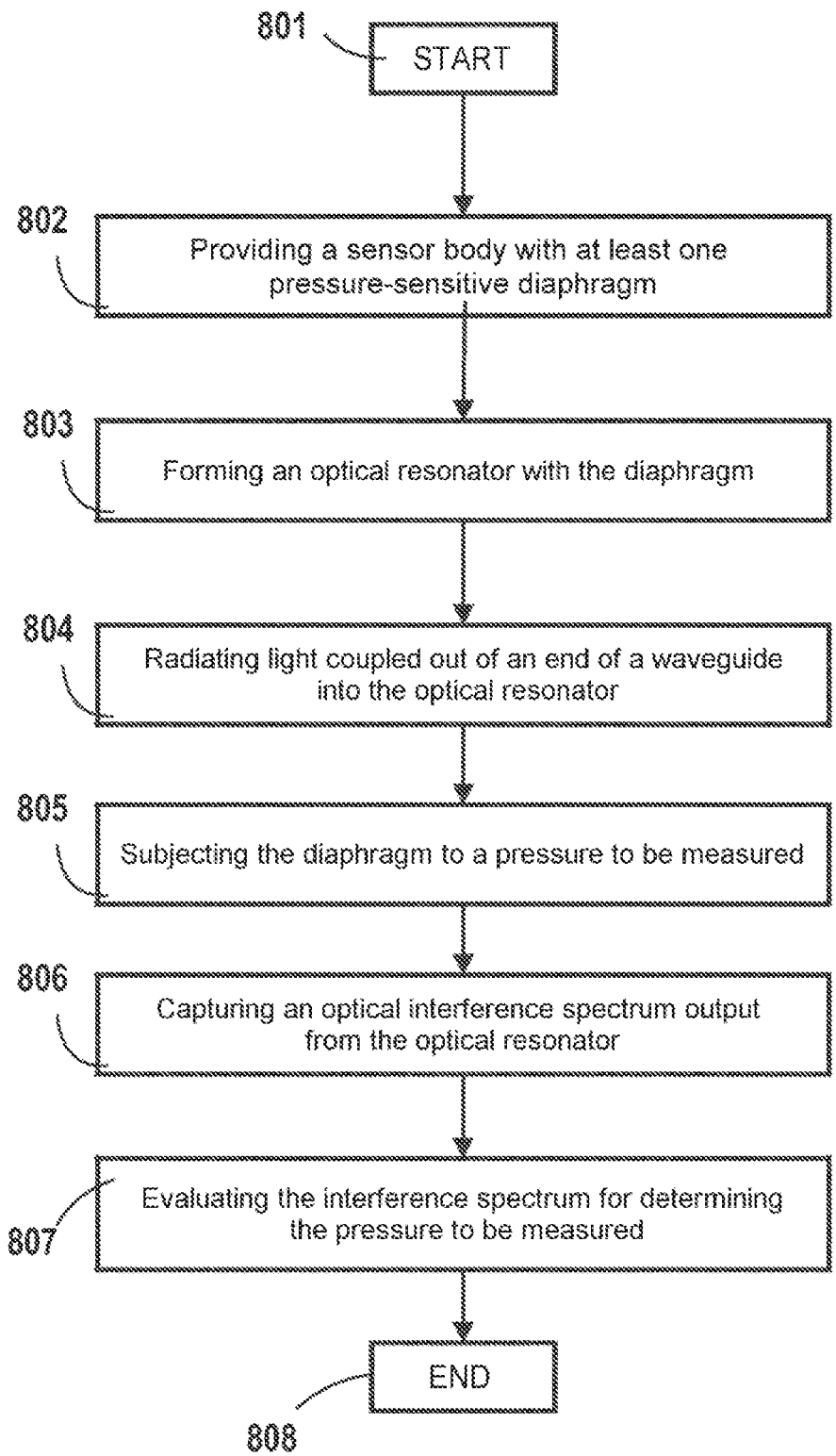
FIG. 7 shows a flow chart for illustrating a method for pressure measurement using a fiber-optic pressure sensor in accordance with embodiments described herein.

FIG. 7 shows a flow chart for illustrating a method for pressure measurement using a fiber-optic pressure sensor 110 according to embodiments described herein.

An optical pressure measurement is started at block 801. Performed next are the provision of the sensor body 300 having at least one pressure-sensitive sensor diaphragm 303 (block 802), forming of the optical resonator 302 with the diaphragm 303 (block 803), and radiating of light coupled out of an end of the waveguide 112 into the optical resonator 302 in block 804. The light that is coupled out of an end of the waveguide 112 is guided into the optical resonator 302 via the optical deflection unit 301 that is arranged between the end of the waveguide and the optical resonator 302.

If the diaphragm 303 is now subjected to pressure to be measured (block 805), it is possible to capture, in a block 806, a pressure-dependent optical interference spectrum that is output from the optical resonator. The light that is reflected into the waveguide 112 from the optical resonator 302 is thus filtered, in particular Fabry-Perot-filtered. In other words, the output optical interference spectrum corresponds to a light component that is reflected by the Fabry-Perot filter.

The evaluation of the interference spectrum for determining the pressure to be measured is finally performed in a block 807. The procedure ends in a block 808.

Figure 8:
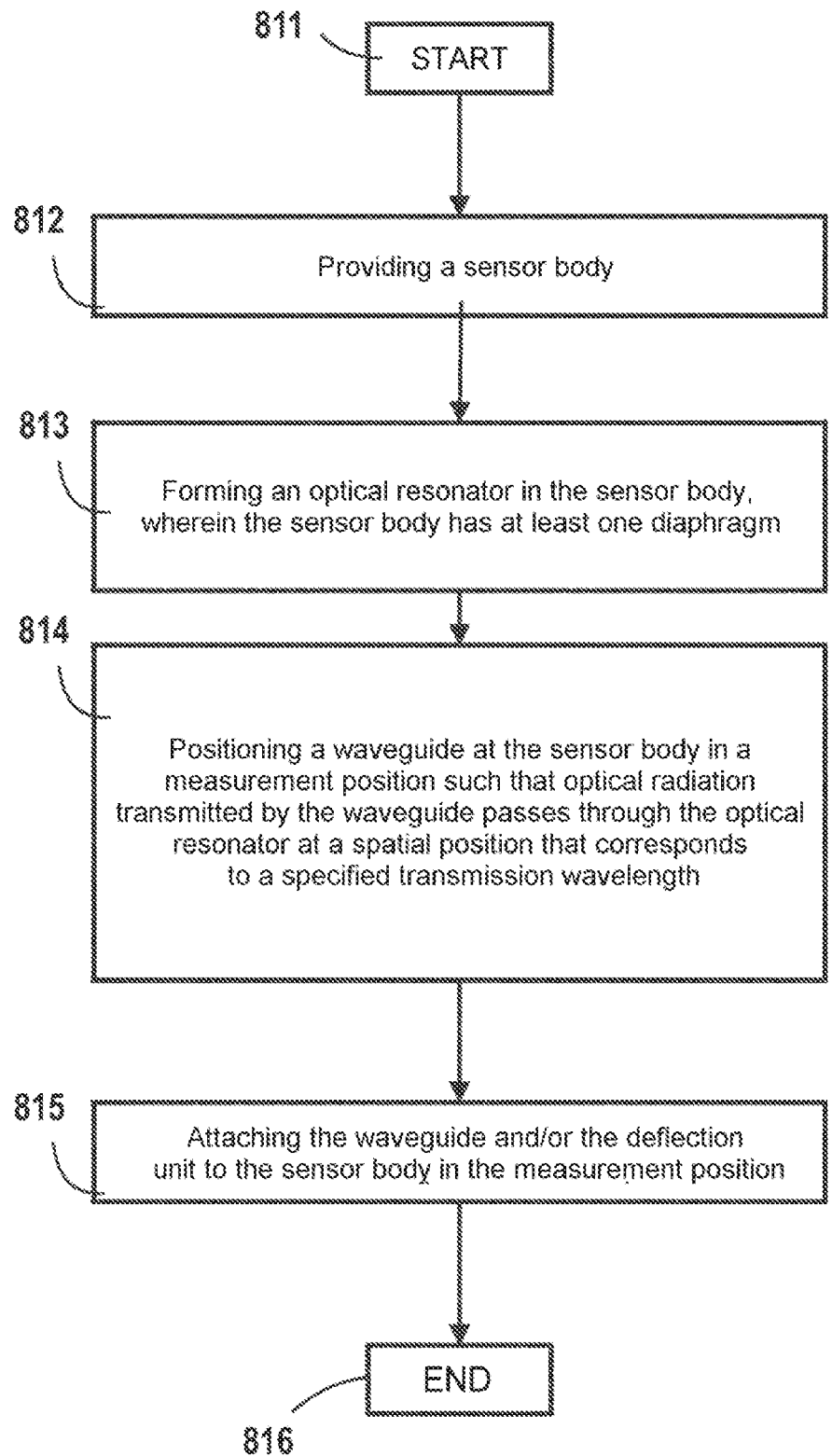
FIG. 8 shows a flow chart for illustrating a method for producing a fiber-optic pressure sensor in accordance with embodiments described herein.

FIG. 8 shows a flow chart for illustrating a method for producing a fiber-optic pressure sensor 110 according to embodiments described herein.

In detail, the method for producing the fiber-optic pressure sensor 110 includes the blocks 811 to 816. The production procedure is started in a block 811. Performed next in a block 812 is the provision of a sensor body 300. In a following block 813, an optical resonator 302 is formed in the sensor body 300, wherein the sensor body 300 has at least one sensor diaphragm 303.

In a block 814, a waveguide 112 is positioned at the sensor body 300 in a measurement position 402 such that optical radiation transmitted by the waveguide 112 passes through the optical resonator 302 at a spatial position that corresponds to a specified transmission wavelength. Lastly follows attachment of the waveguide 112 and/or the deflection unit 301 to the sensor body 300 in the measurement position 402 (block 815). The production procedure for the fiber-optic pressure sensor 110 ends in a block 816.

Further applications of the fiber-optic pressure sensor 110 can be found in the area of measuring acoustic and static signals. Due to the detection of acoustic signals, for example airborne sound or structure-borne sound measurement apparatuses are made possible. Here, the sound signals can be transferred to the sensor diaphragm 300 of the fiber-optic pressure sensor 110, wherein acoustic frequencies in a region of 1 kHz or higher, typically in a region of 5 kHz or higher, can be detected.

The fiber-optic pressure sensor 110 can furthermore be used to measure acceleration approximately perpendicularly with respect to the surface of the sensor diaphragm 303. It is advantageous here if a mass that is connected to the sensor diaphragm upper side is provided. The mass can here be provided either in addition to the mass of the diaphragm, or the diaphragm can have a suitable mass of sufficient magnitude. In addition to pressure and acceleration measurements at rotor blades 100, the fiber-optic pressure sensor 110 therefore also permits pressure and acceleration measurements on airfoils, wings, lightweight structures etc.

A further application is the use of the fiber-optic pressure sensor 110 in the capturing of pressure in fluids. It is advantageous here if the sensor diaphragm 303 is in contact, on its upper side, with the fluid to be measured.

Although the present invention has been described herein with reference to typical exemplary embodiments, it is not limited thereto, but is modifiable in many ways. The invention is not limited to the application possibilities mentioned either.

The invention claimed is:
1. A fiber-optic pressure sensor, comprising:
   a waveguide having an end;
   an optical deflection unit connected to the end of the waveguide for deflecting light that is coupled out of the end of the waveguide; and
   a sensor body at which an optical resonator is formed by way of a diaphragm,
   wherein the optical resonator has a varying length parallel with respect to the diaphragm, and
   wherein the waveguide and/or the deflection unit is/are attached to the sensor body by way of a curable adhesive or a solder connection.

2. The fiber-optic pressure sensor as claimed in claim 1, wherein the optical resonator is a Fabry-Perot interferometer which forms a cavity with the diaphragm.

3. The fiber-optic pressure sensor as claimed in claim 2, wherein the optical resonator forms the cavity which is closed off in an airtight manner with respect to the surrounding area and has a predetermined internal pressure.

4. The fiber-optic pressure sensor as claimed in claim 1, wherein the fiber-optic pressure sensor furthermore comprises at least one of the following: a gradient index lens (GRIN lens), a micro mirror, a prism, a spherical lens, or any combination thereof.

5. The fiber-optic pressure sensor as claimed in claim 1, wherein the deflection unit comprises a deflection prism.

6. The fiber-optic pressure sensor as claimed in claim 1, wherein the deflection unit is formed monolithically together with the end of the waveguide.

7. The fiber-optic pressure sensor as claimed in claim 1, wherein the waveguide extends in a direction approximately parallel with respect to a surface of the optical resonator.

8. A method for pressure measurement, comprising:
   providing a sensor body having at least one pressure-sensitive diaphragm;
   forming an optical resonator with the at least one diaphragm, wherein the optical resonator has a varying length parallel with respect to the at least one diaphragm;

deflecting light that is coupled out of an end of a waveguide;

radiating the deflected light into the optical resonator;

applying pressure to be measured to the at least one diaphragm;

capturing an optical interference spectrum that is output from the optical resonator; and evaluating the interference spectrum to determine the pressure to be measured.

9. The method as claimed in claim 8, further comprising measuring acceleration in a direction that is approximately perpendicular with respect to a surface of the optical resonator.

10. The method as claimed in claim 8, wherein the light in the optical resonator is guided via an optical deflection unit that is arranged between the end of the waveguide and the optical resonator.

11. The method as claimed in claim 8, wherein the light that is radiated into the optical resonator is Fabry-Perot-filtered.

12. A method for producing a fiber-optic pressure sensor, comprising the operations:

providing a sensor body;

forming an optical resonator in the sensor body, wherein the sensor body has at least one diaphragm, and wherein the optical resonator has a varying length parallel with respect to the at least one diaphragm;

positioning a waveguide at the sensor body in a measurement position such that optical radiation that is transmitted by the waveguide passes through the optical resonator at a spatial position that corresponds to a specified transmission wavelength; and attaching the waveguide and/or the deflection unit to the sensor body in the measurement position.

13. The method as claimed in claim 12, wherein attaching the waveguide and/or the deflection unit to the sensor body in the measurement position is performed by way of adhesive bonding or soldering.

14. The method as claimed in claim 12, wherein positioning the waveguide comprises positioning an optical deflection unit, which is connected to an end of the waveguide, at the sensor body in a measurement position such that optical radiation, which has been transmitted by the waveguide and deflected using the deflection unit, passes through the optical resonator at a spatial position that corresponds to the specified transmission wavelength.

15. The method as claimed in claim 12, wherein forming the optical resonator comprises forming a resonator having a varying length parallel with respect to the at least one diaphragm.

* * * * *